US006594281B1

(12) United States Patent
Tomida et al.

(10) Patent No.: US 6,594,281 B1
(45) Date of Patent: Jul. 15, 2003

(54) FM MULTIPLEX BROADCASTING RECEIVER AND STORAGE OF RECEIVED DATA IN FM MULTIPLEX BROADCASTING RECEIVER

(75) Inventors: Yoshikazu Tomida, Hirakata (JP); Tatsuo Hiramatsu, Musashino (JP); Hironori Mitoh, deceased, late of Osaka (JP), by Yoshimi Mitoh, legal representative; Masahiro Sata, Sakai (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/308,624

(22) PCT Filed: Dec. 12, 1997

(86) PCT No.: PCT/JP97/04570

§ 371 (c)(1), (2), (4) Date: May 25, 1999

(87) PCT Pub. No.: WO98/27676

PCT Pub. Date: Jun. 25, 1998

(30) Foreign Application Priority Data

Dec. 17, 1996 (JP) ........................................ 8-337246

(51) Int. Cl.[7] ........................................ H04J 1/00

(52) U.S. Cl. .................... 370/480; 370/436; 455/158.2

(58) Field of Search ......................... 455/45, 66, 186.1, 455/68, 185.1, 228, 158.1, 158.2, 154.1; 375/224, 200, 316, 317; 370/430, 412–418, 436, 480, 537, 395.1, 535, 536, 281, 295, 343, 344; 345/169; 381/2

(56) References Cited

U.S. PATENT DOCUMENTS

| | | | | | |
|---|---|---|---|---|---|
| 5,063,610 | A | * | 11/1991 | Alwadish | 455/45 |
| 5,161,251 | A | * | 11/1992 | Mankovitz | 455/66 |
| 6,038,434 | A | * | 3/2000 | Miyake | 455/186.1 |

FOREIGN PATENT DOCUMENTS

| | | |
|---|---|---|
| JP | 8-279796 | 10/1996 |
| JP | 8-330994 | 12/1996 |
| JP | 8-331074 | 12/1996 |

* cited by examiner

*Primary Examiner*—Hassan Kizou
*Assistant Examiner*—John Pezzlo
(74) *Attorney, Agent, or Firm*—Arent Fox Kintner Plotkin & Kahn

(57) ABSTRACT

A prefix corresponding to a data block at the head of each of data groups in data of a layer 3 of a received FM multiplex broadcast program and data of a layer 4 of the received FM multiplex broadcast program are stored in first storage means. When a data retention command is entered, the data of the layer 3 is produced on the basis of the prefix and the data of the layer 4 which are stored in the first storage means, and the produced data of the layer 3 is retained in second storage means as versatile recording and reproducing data.

4 Claims, 8 Drawing Sheets

FM MULTIPLEX BROADCASTING RECEIVER AND STORAGE OF RECEIVED DATA IN FM MULTIPLEX BROADCASTING RECEIVER

TECHNICAL FIELD

The present invention relates to an FM multiplex broadcasting receiver and a method of retaining received data in the FM multiplex broadcasting receiver.

BACKGROUND ART

FM multiplex broadcasting is for broadcasting voices, characters, figures together with stereo voices, that is, one for multiplexing voices, characters and figures on normal FM broadcasting and broadcasting the multiplexed voices, characters and figures.

Typical examples of the standard of the FM multiplex broadcasting include three systems, that is, DARC (Data Radio Channel), a fixed receiving system, and RDS (Radio Data System). The DARC is the newest, and is employed as an international standard. The DARC is described in accordance with "Reference Model of Data Broadcasting" in Recommendation 807 of ITU-R (International Telecommunication Union).

The DARC is for converting characters and figures into digital information, modulating a sub-carrier frequency of 76 kHz and frequency-multiplexing the sub-carrier frequency on a stereo base band signal, frequency-modulating the multiplexed signal, and broadcasting the frequency-modulated multiplexed signal.

FIG. 6 illustrates a layer structure representing a character/figure coding system of the DARC.

A layer 1 specifies transmission path characteristics. A sub-carrier signal is superimposed on the side of higher frequencies than those of an L+R signal and an L–R signal which are normal FM stereo broadcasting signals. Modulation method of sub-carrier employs an LMSK (Level-controlled Minimum Shift Keying) method for controlling the level of a sub-carrier by the degree of modulation of the L–R signal in consideration of the fact that the interference of the sub-carrier with a voice signal becomes significant when the degree of voice modulation is small.

A layer 2 defines a frame structure of data including an error-correcting system. Each of frames is composed of 272 blocks in the column direction, and a 16-bit block identification code (BIC) is added to the head thereof. Frame synchronization and block synchronization are achieved on the basis of the block identification code. 190 blocks out of the 272 blocks in the column direction are a packet for transmitting data, and 82 blocks are a parity packet for transmitting a parity in the vertical direction. Each of the packets is composed of a 176-bit data portion, 14-bit CRC (Cyclic Redundancy Code) which is an error-detecting code and a 82-bit horizontal parity portion in the row direction.

Transmitted data is first subjected to error correction in a step of the layer 2 with its one frame as a basic unit. In practice, the transmitted data is sent out in a frame structure in which packets and parity packets are arranged again in a predetermined order in the longitudinal direction, as shown in FIG. 7.

A layer 3 defines the structure of a data packet. The data packet is composed of 176 bits excluding BIC, CRC and a parity in each row in a frame. The data packet is composed of a prefix and a data block.

A layer 4 indicates the structure of a data group. The data group is composed of one or a plurality of data blocks. The data group also includes CRC which is an error-detecting code. The transmitted data is also subjected to error detection in the layer 4. One of the data groups corresponds to data on one page.

A layer 5 defines the structure of a bundle of information transmitted by FM multiplex broadcasting, that is, program data.

FIG. 8 illustrates using functional blocks the schematic construction of an FM multiplex broadcasting receiver utilizing a personal computer.

The FM multiplex broadcasting receiver comprises a tuner 301, a sub-carrier data receiving LSI302 a receiving processing unit 303, a program reconstructing unit 304, a program analyzing unit 305, a display processing unit 306, a plotting unit 307, and a display 308. In an FM multiplex broadcasting receiver utilizing a personal computer, the tuner 301, the sub-carrier data receiving LSI 302, and the receiving processing unit 303 are constituted by a PC card or the like. Further, the program reconstructing unit 304, the program analyzing unit 305, the display processing unit 306, the plotting unit 307, and the display 308 are constituted by the personal computer.

The sub-carrier data receiving LSI 302 performs LMSK demodulation and error correction on the basis of an output from the tuner 301. In the sub-carrier data receiving LSI 302, signals of a layer 1 is converted into data of a layer 2.

The receiving processing unit 303 accepts required ones of data in block units outputted from the LSI 302. In the receiving processing unit 303, the data of the layer 2 is converted into data of a layer 3.

The program reconstructing unit 304 reconstructs a program. In the program reconstructing unit 304, the data of the layer 3 is converted into data of a layer 4.

The program analyzing unit 305 performs decoding processing conforming to an eight level coding system. In the program analyzing unit 305, the data of the layer 4 is converted into data of a layer 6 (the eight-bit coding system).

The display processing unit 306 acquires a plotting pattern, and subjects the plotting pattern to various types of processing. The plotting unit 307 outputs the plotting pattern obtained by the display processing unit 306 to the display 308.

In the FM multiplex broadcasting receiver, examples of a method of retaining a received program in a data format which can be versatily recorded and reproduced include a method of retaining text data obtained by the program analyzing unit 305 and a method of retaining bit map data obtained by the display processing unit 306.

When the received program is stored in a text format or a bit map format, information representing the hierarchical structure of the program, selection of the program, a plotting operation, and the like cannot be retained, whereby the original program at the time of receiving cannot be faithfully reproduced.

Therefore, it is considered that only the data of the layer 4 obtained by the program reconstructing unit 304 is retained. When only the data of the layer 4 is stored, however, there is no prefix including data representing service identification or the like, whereby the original program at the time of receiving cannot be faithfully reproduced. In the FM multiplex broadcasting receiver, when the data of the layer 4 is retained in a RAM, it is retained in the RAM in its own method such that the prefix is reflected. A system for storing the data of the layer 4 in the RAM is not standardized in all FM multiplex broadcasting receivers.

An object of the present invention is to provide an FM multiplex broadcasting receiver capable of retaining a received program in such a data format that the original program at the time of receiving can be faithfully reproduced by various types of applications for reproducing FM multiplex broadcasting and a method of retaining received data in the FM multiplex broadcasting receiver.

DISCLOSURE OF INVENTION

An FM multiplex broadcasting receiver according to the present invention is characterized by comprising means for storing in first storage means a prefix corresponding to a data block at the head of each of data groups of a received FM multiplex broadcast program and data of a layer 4 of the received FM multiplex broadcast program, an input device for entering a data retention command, and means for producing the data of the layer 3 on the basis of the prefix and the data of the layer 4 which are stored in the first storage means when the data retention command is entered and retaining in second storage means the produced data of the layer 3 as versatile recording and reproducing data.

The first storage means and the second storage means may be the same storage device.

A method of retaining received data in an FM multiplex broadcasting receiver according to the present invention is characterized by comprising the steps of storing in first storage means a prefix corresponding to a data block at the head of each of data groups of a received FM multiplex broadcast program and data of a layer 4 of the received FM multiplex broadcast program, and producing the data of the layer 3 on the basis of the prefix and the data of the layer 4 which are stored in the first storage means when a data retention command is entered and retaining in second storage means the produced data of the layer 3 as versatile recording and reproducing data.

The first storage means and the second storage means may be the same storage device.

BEST MODE FOR CARRYING OUT THE INVENTION

Referring now to FIGS. 1 to 5, an embodiment in a case where the present invention is applied to an FM multiplex broadcasting receiver utilizing a personal computer.

Figure 1:
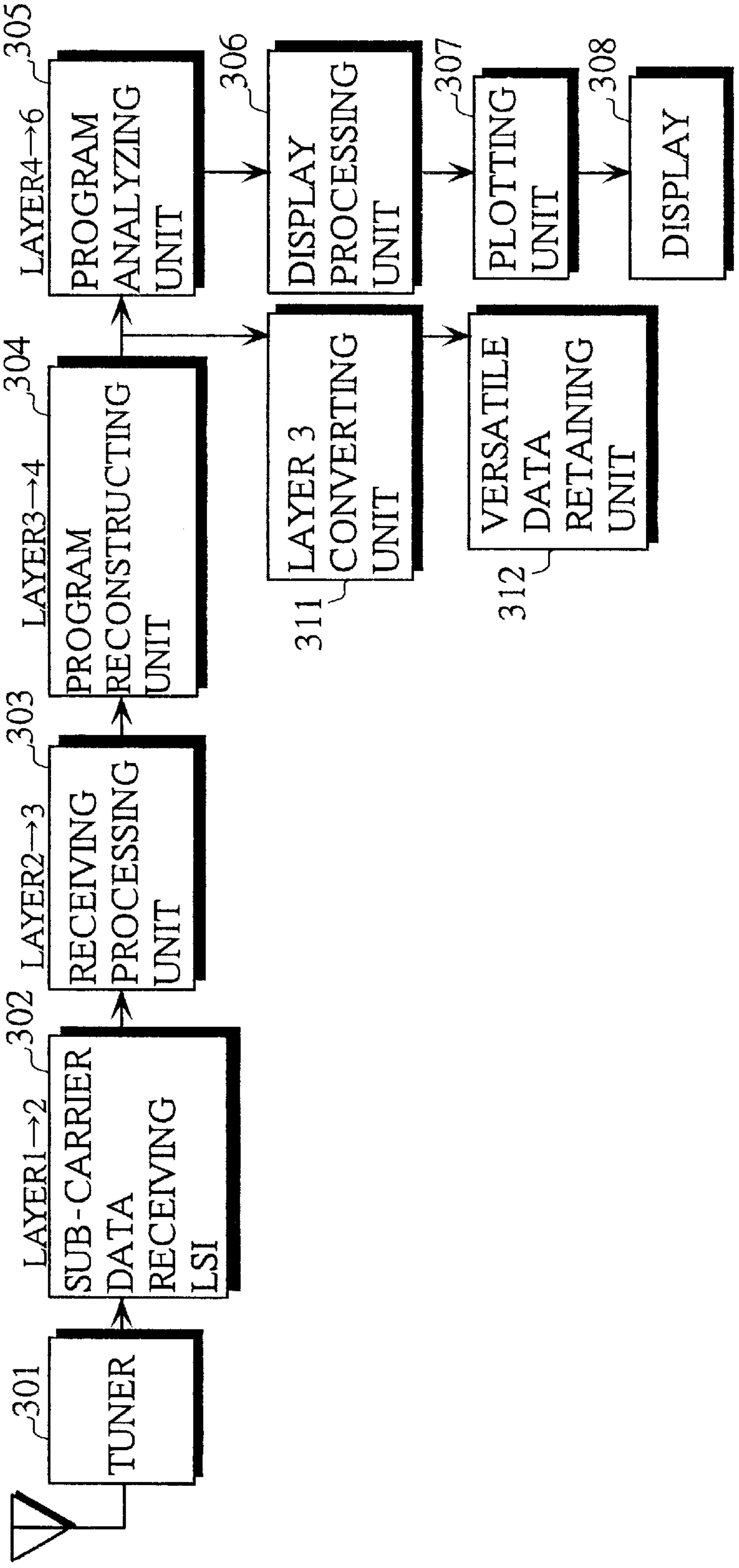
FIG. 1 is a block diagram functionally showing the schematic construction of an FM multiplex broadcasting receiver.
Figure 8:
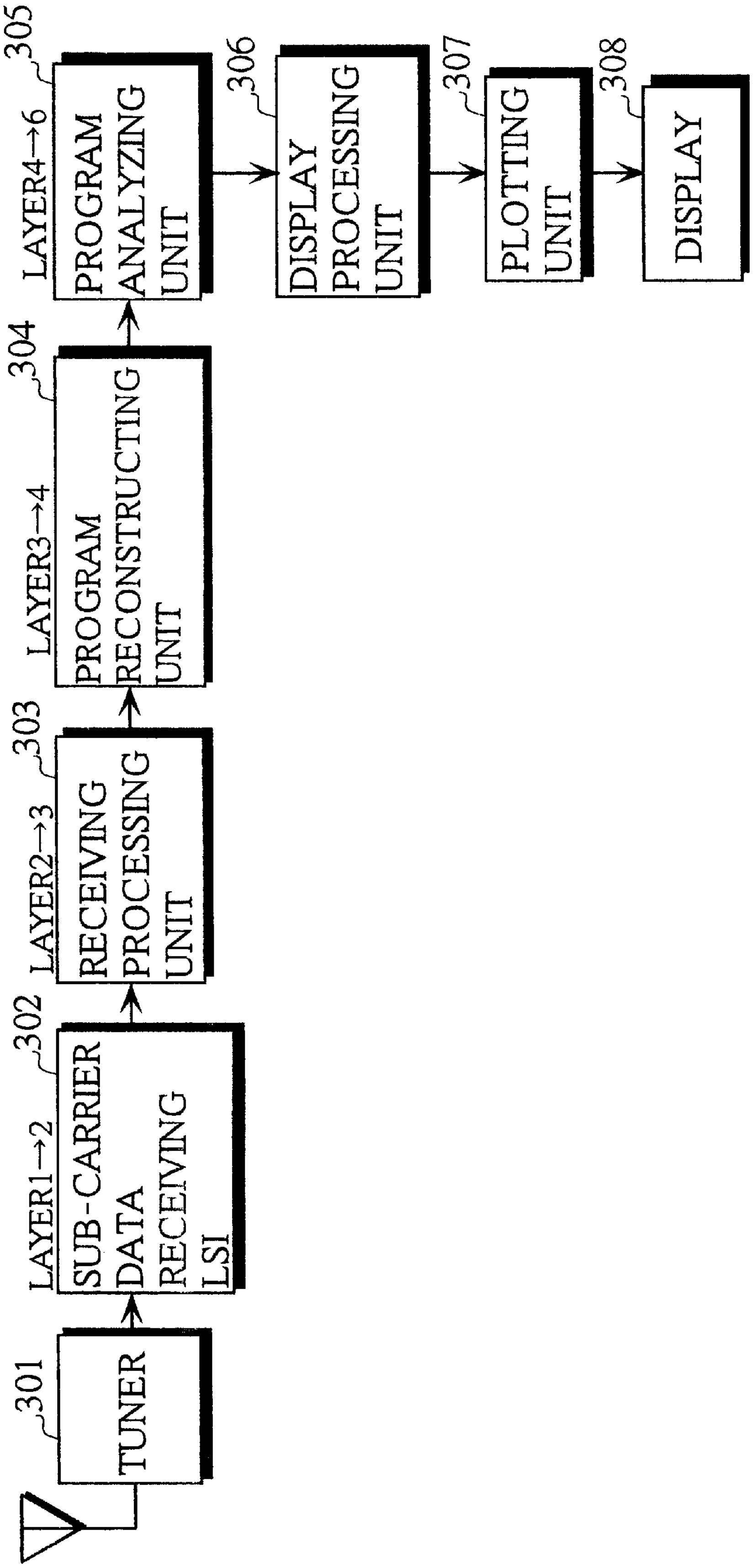
FIG. 8 is a block diagram functionally showing the construction of a conventional FM multiplex broadcasting receiver.

FIG. 1 functionally illustrates the schematic construction of an FM multiplex broadcasting receiver utilizing a personal computer. In FIG. 1, components corresponding to ones shown in FIG. 8 are assigned the same reference numerals. Data of a layer 4 which is obtained by a program reconstructing unit 304 is stored in a storage device 44 in the personal computer (see FIG. 4). In the FM multiplex broadcasting receiver, a prefix corresponding to a data block at the head of each of data groups in data of a layer 3 which is obtained by a receiving processing unit 303 is also stored in the storage device 44 in the personal computer (see FIG. 4), unlike the conventional FM multiplex broadcasting receiver.

When a received FM multiplex broadcast program is stored in a data format which can be versatily recorded and reproduced, the data of the layer 4 is converted into the data of the layer 3 by a layer 3 converting unit 311. The obtained data of the layer 3 is retained as versatile data in the storage device 44 in the personal computer by a versatile data retaining unit 312. The layer 3 converting unit 311 converts the data of the layer 4 which is stored in the storage device 44 into the data of the layer 3 on the basis of the prefix corresponding to the data block at the head of each of the data groups which is stored in the storage device 44.

Figure 2:
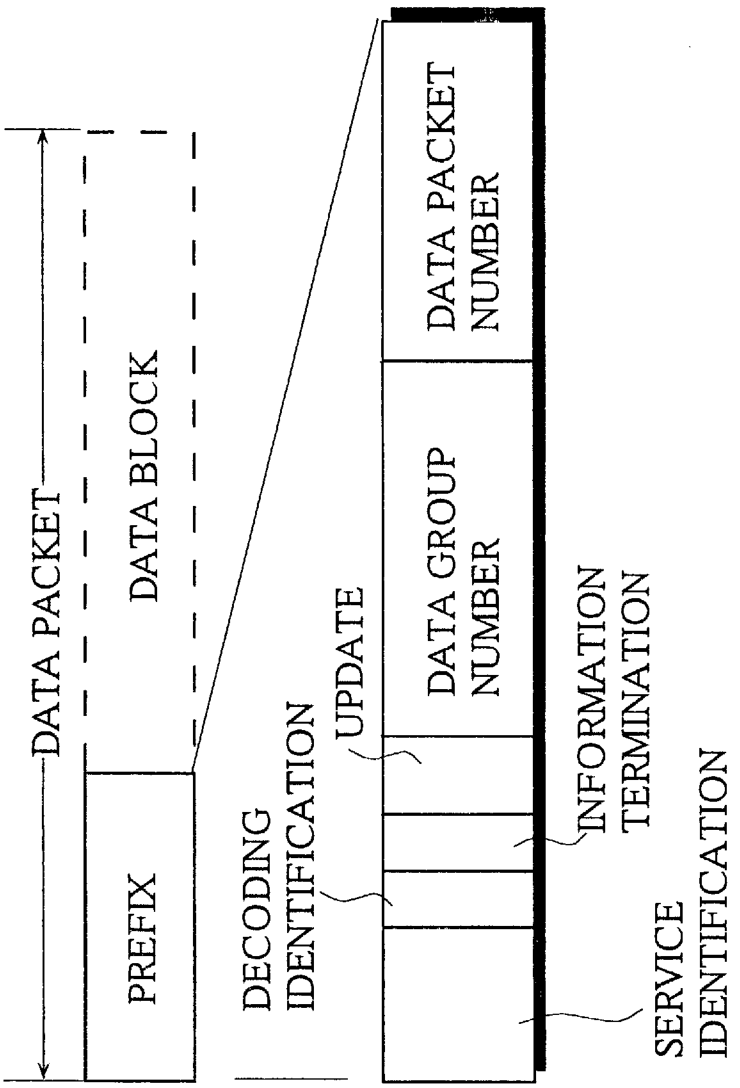
FIG. 2 is a schematic view showing the structure of a data packet in a layer 3.

The prefix corresponding to each of the data blocks in the layer 3 comprises a service identification code for identifying the program contents (general information, traffic information, additional information, auxiliary information, and an operating signal), a decoding identification flag, an information termination flag, an update flag, a data group number and a data packet number, as shown in FIG. 2. The prefix corresponding to each of the data blocks is reproduced on the basis of the prefix corresponding to the data block at the head of each of the data groups.

Specifically, the service identification code, the decoding identification flag, the update flag and the data group number are the same in one data group. Therefore, the information corresponding to each of the data blocks are the same as the information in the prefix corresponding to the data block at the head of each of the data groups. Further, the information termination flag is set to one only in the final packet. The data packet numbers are assigned in ascending order to the data blocks with the data packet number assigned to the data block at the head of the data group appearing first.

Figure 3:
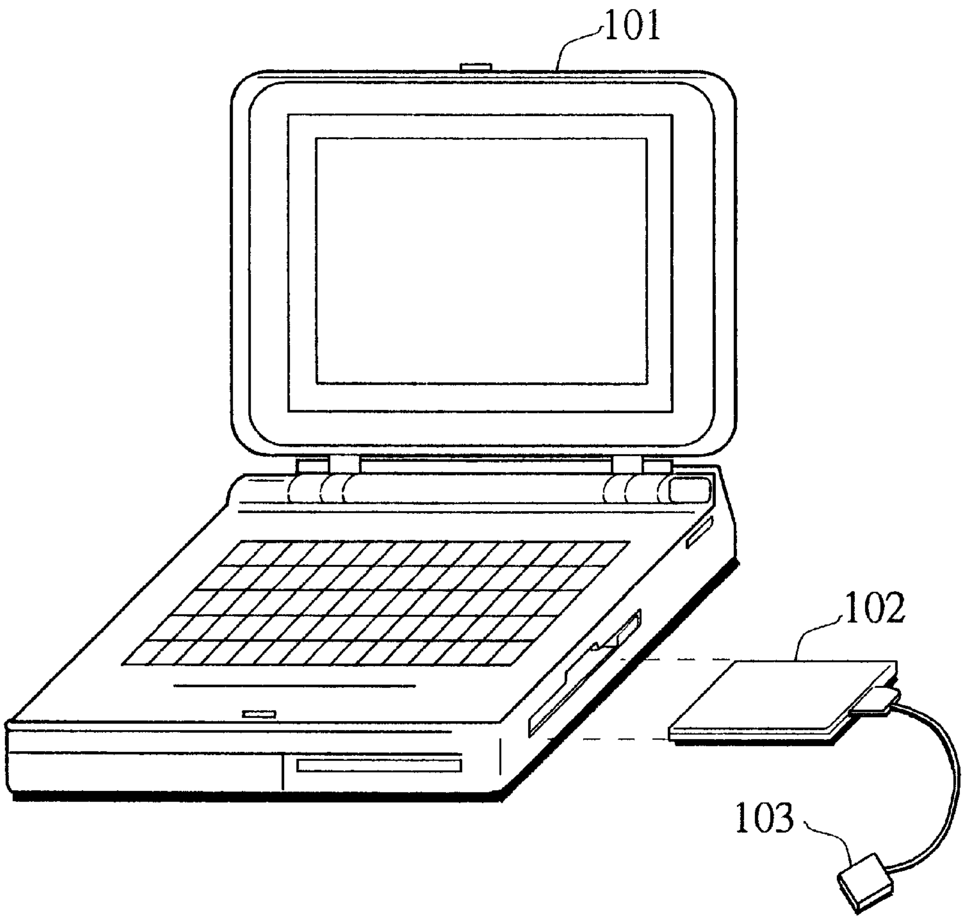
FIG. 3 is a perspective view showing the appearance of the FM multiplex broadcasting receiver.

FIG. 3 illustrates the appearance of an FM multiplex broadcasting receiver utilizing a personal computer.

The FM multiplex broadcasting receiver comprises a notebook-sized personal computer 101, a PC card 102 constituting an FM multiplex decoding unit 15 as described later (corresponding to the sub-carrier data receiving LSI 302 and the receiving processing unit 303 in FIG. 1), and a tuner unit 103 constituting an FM tuner unit 14 as described later (corresponding to the tuner 301 in FIG. 1).

The notebook-sized personal computer 101 has the functions of the program reconstructing unit 304, a program analyzing unit 305, a display processing unit 306, a plotting unit 307, a display 308, the layer 3 converting unit 311, and the versatile data retaining unit 312 by installing particular software therein.

Figure 4:
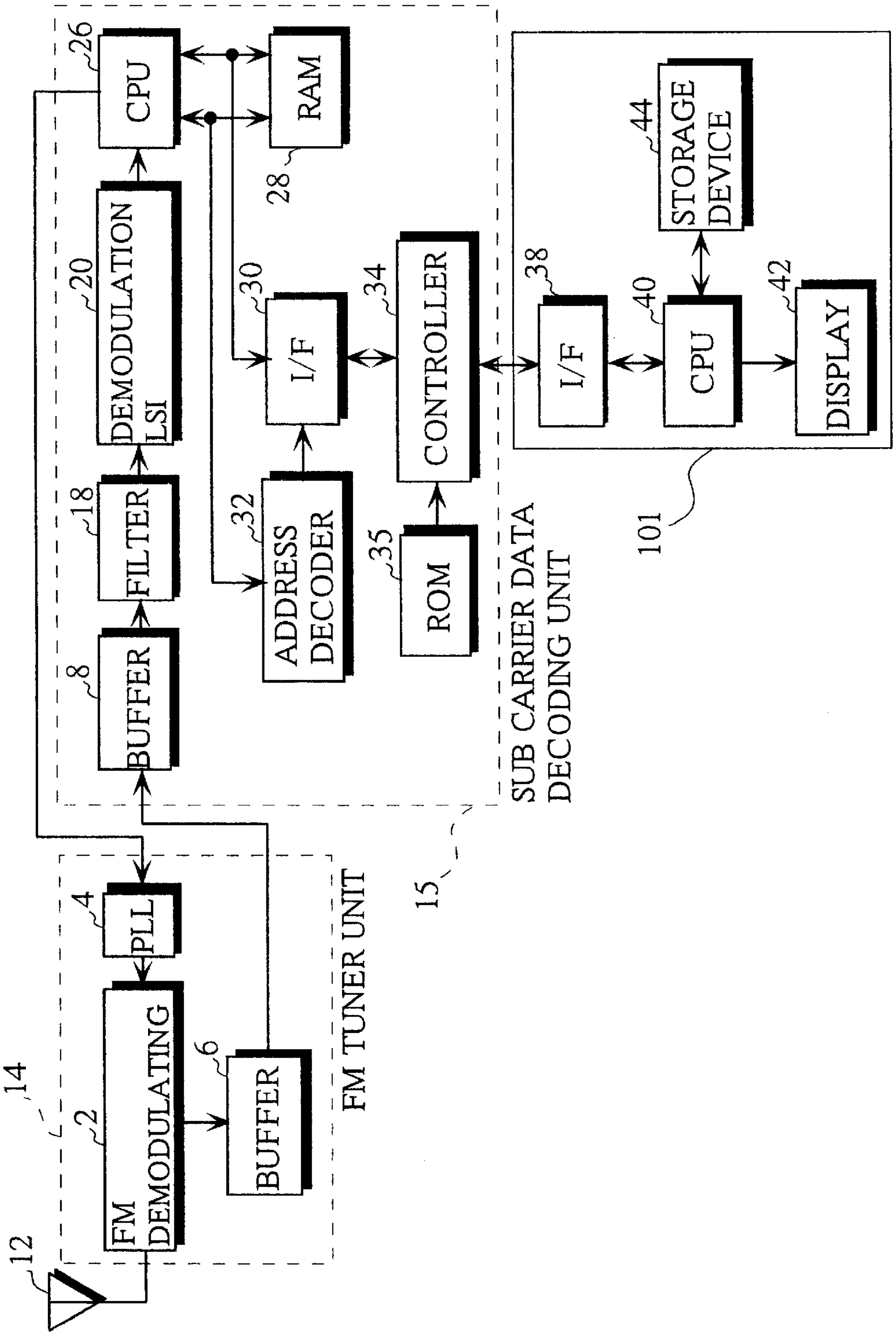
FIG. 4 is a block diagram functionally showing the electrical construction of the FM multiplex broadcasting receiver.

FIG. 4 illustrates the electrical construction of the FM multiplex broadcasting receiver.

An FM multiplex broadcasting signal received by an antenna 12 is sent to an FM demodulating circuit 2 in the FM tuner unit 14. The FM multiplex broadcasting signal sent to the FM demodulating circuit 2 is subjected to synchronous detection by local oscillatory wave outputted from a PLL circuit 4, and is then outputted to the sub-carrier data decoding unit 15 through a buffer 6.

The signal inputted to the sub-carrier data decoding unit 15 is sent to a band-pass filter 18 through a buffer circuit 8. In the band-pass filter 18, a signal component in a predetermined frequency band is taken out. An output of the band-pass filter 18 is sent to a demodulation LSI 20, so that LMSK demodulation, synchronous detection and error correction are performed.

A CPU 26 reads out received data from the demodulation LSI 20 upon receipt of a data transfer request issued for each 18 msec from the demodulation LSI 20. In a RAM 28, the data from the CPU 26 is stored at a rate of one packet per 18 msec. The RAM 28 is operated as a buffer for outputting data to an interface 30.

An address decoder 32 causes the interface 30 to output data when it detects that the CPU 26 gains access to the personal computer 101. A controller 34 outputs data to the personal computer 101 upon receipt of the data (data of a layer 3) outputted from the interface 30. At the time of activating the FM multiplex broadcasting receiver, the controller 34 achieves initialization between the interfaces 30 and 38 on the basis of data stored in the ROM 35.

A CPU 40 in the personal computer 101 receives the packet data (data of a layer 3) outputted from the sub-carrier data decoding unit 15 through the interface 38. The CPU 40 extracts a data block from the received packet data, reconstructs a data group from the data block, and subjects the data group to error detection. Further, the CPU 40 extracts a prefix corresponding to a data block at the head of each of data groups from the received packet data, and stores the prefix in the storage device 44.

The reconstructed data groups are successively stored in units of pages in the storage device 44 for each program. The CPU 40 selects predetermined page data, and outputs the page data to the display unit 42. The display unit 42 outputs corresponding character information and figure information on the basis of the sent page data.

The CPU 40 performs data retaining processing when a command to retain a received program is entered by a user.

Figure 5:
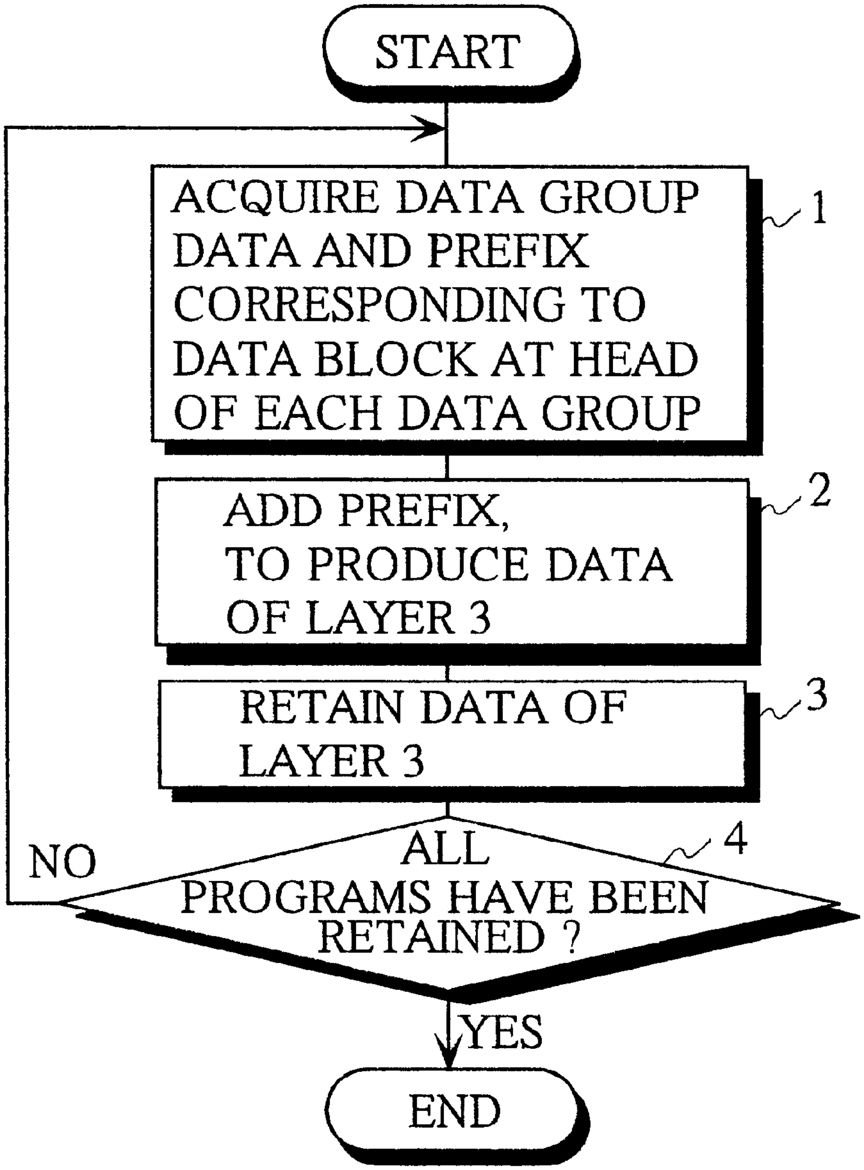
FIG. 5 is a flow chart showing the procedure for data retaining processing in a CPU 40.
Figure 6:
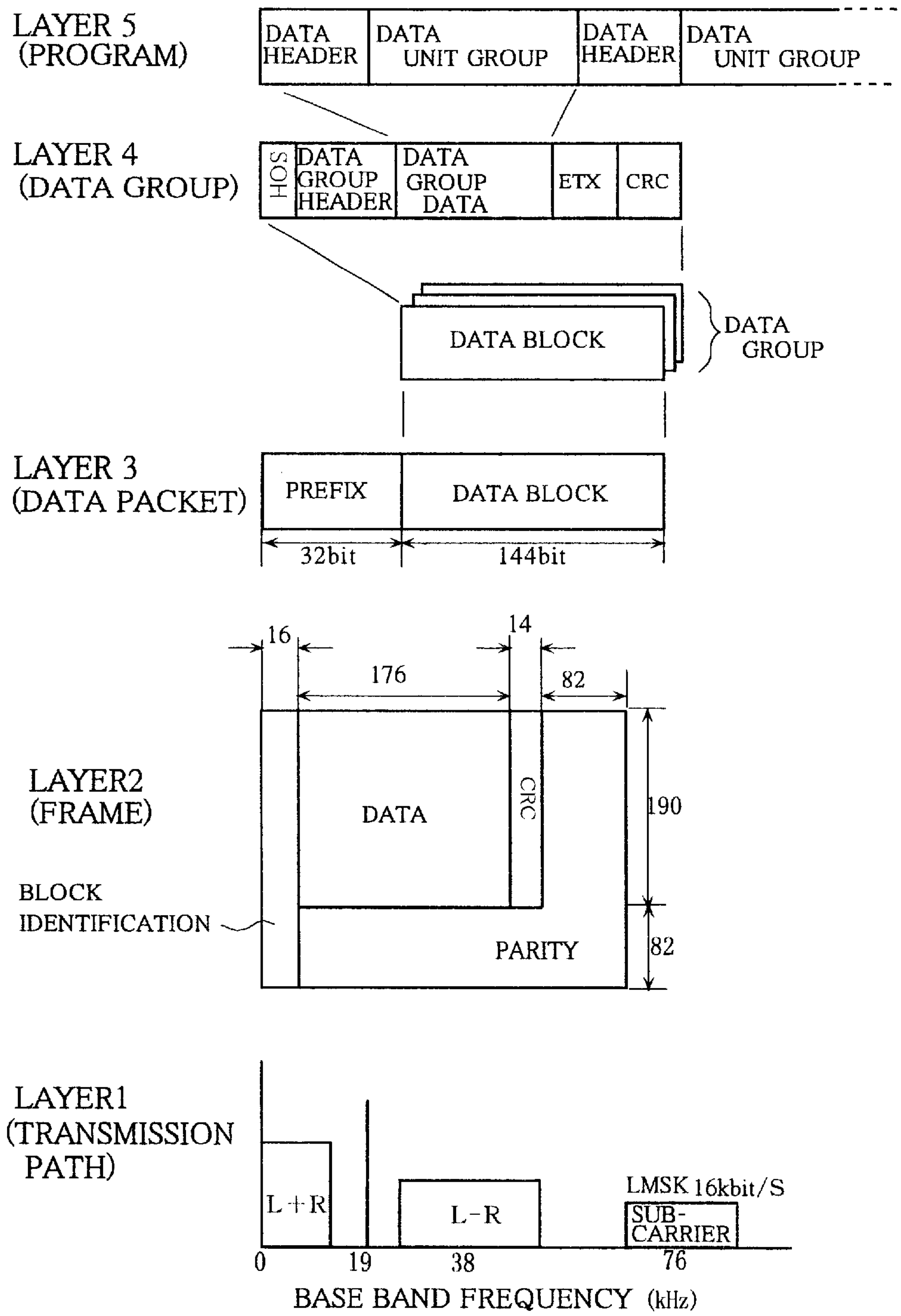
FIG. 6 is a schematic view showing the hierarchical structure representing a character/figure coding system of DARC.
Figure 7:
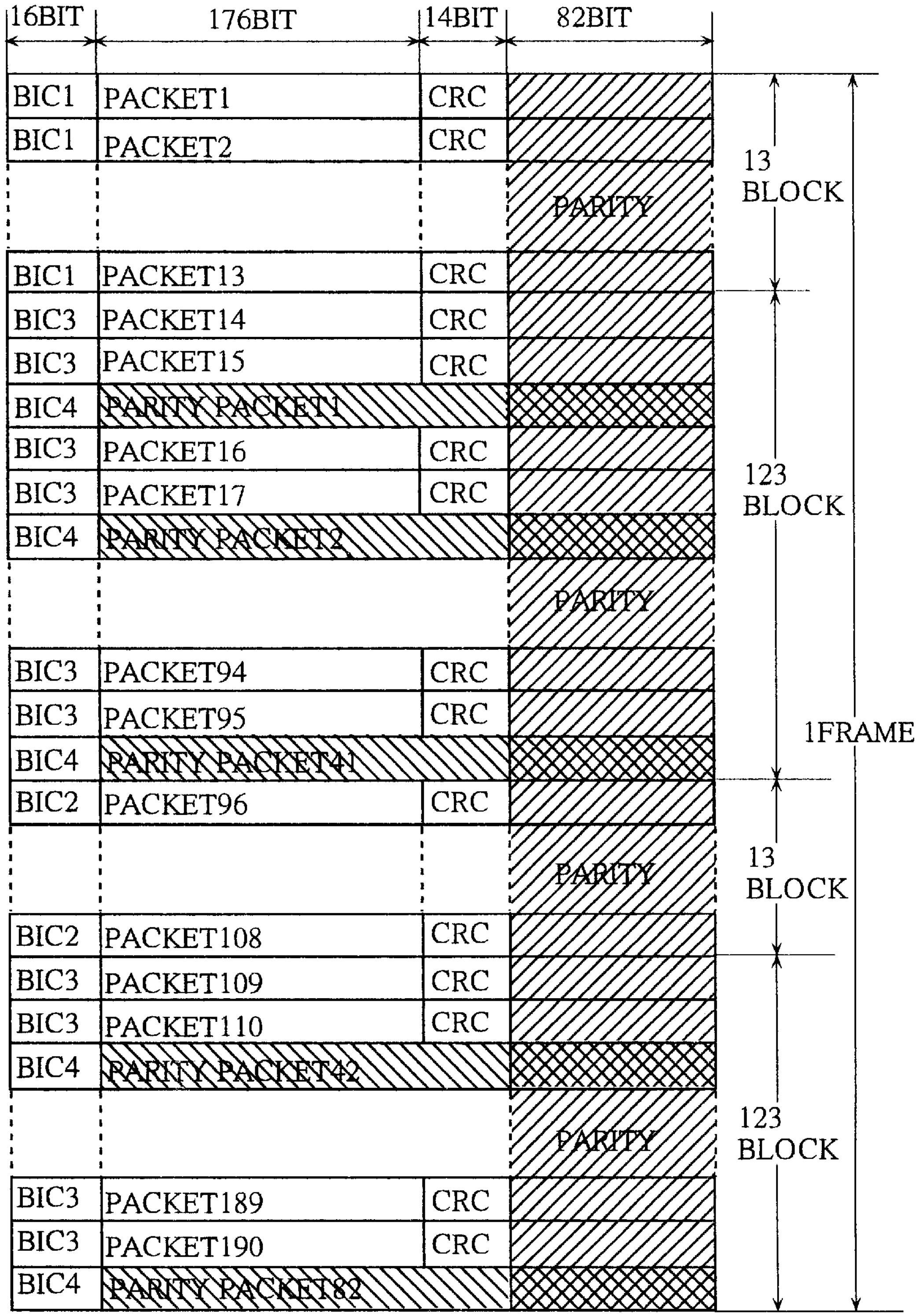
FIG. 7 is a schematic view showing the frame structure of DARC.

FIG. 5 shows the procedure for the data retaining processing by the CPU 40.

Data group data in a layer 4 and the prefix corresponding to the data block at the head of each of the data groups which are stored in the storage device 44 are first acquired (step 1).

A prefix corresponding to each of data blocks constituting the acquired data group data is then reproduced on the basis of the prefix corresponding to the data block at the head of each of the data groups which is acquired in the step 1, and a prefix corresponding to each of data blocks included in the layer 4 is added thereto (step 2). Data of a layer 3 is thus produced.

The obtained data of the layer 3 is retained in the storage device 44 as versatile recording and reproducing data (step 3). When such processing is terminated with respect to all programs (step 4), the current data retaining processing is terminated.

According to the above-mentioned embodiment, the data of the layer 3 can be stored as versatile recording and reproducing data. In various types of applications for reproducing FM multiplex broadcasting, therefore, the original programs at the time of receiving can be faithfully reproduced from the retained data.

What is claimed is:

1. An FM multiplex broadcasting receiver comprising:

means for storing in first storage means a prefix corresponding to a data block at the head of each of data groups of a received FM multiplex broadcast program and data of a first layer of the received FM multiplex broadcast program;

an input device for entering a data retention command; and means for producing data of a second layer based on the prefix and the data of the first layer which are stored in said first storage means when the data retention command is entered and for retaining in a second storage means the produced data of the second layer as a recording and reproducing data.

2. The FM multiplex broadcasting receiver according to claim 1, wherein said first storage means and said second storage means are the same storage device.

3. A method of retaining received data in an FM multiplex broadcasting receiver, comprising the steps of:

storing in first storage means a prefix corresponding to a data block at the head of each a plurality of data groups of a received FM multiplex broadcast program and data of a first layer of the received FM multiplex broadcast program; and producing data of a second layer based on the prefix and the data of the first layer which are stored in said first storage means when a data retention command is entered and retaining in a second storage means the produced data of the second layer as a recording and reproducing data.

4. The method according to claim 3 wherein said first storage means and said second storage means are the same storage device.

* * * * *